United States Patent Office 3,701,624
Patented Oct. 31, 1972

3,701,624
DYEING COTTON AND PAPER WITH BIS(ARYL-AZO OR SULFOARYLAZO)-J-ACID UREA REACTION MIXTURE AND COMPOSITION THEREFOR
Richard C. Franklin, Wilmington, Del., assignor to E. I. du Pont de Nemours and Company, Wilmington, Del.
No Drawing. Original application Oct. 3, 1968, Ser. No. 764,966, now Patent No. 3,600,376. Divided and this application Feb. 1, 1971, Ser. No. 111,604
Int. Cl. C09b *35/26;* D06p *1/04;* D21h *1/46*
U.S. Cl. 8—7
2 Claims

ABSTRACT OF THE DISCLOSURE

Direct bis(arylazo- and sulfoarylazo)-J-acid urea dyestuffs, useful for dyeing cellulosic materials, their preparation by a process which comprises coupling an aryl or sulfoaryl diazonium compound to J-acid urea in a neutral to alkaline aqueous medium to which is added a lithium base selected from the hydroxide, bicarbonate and carbonate, and stable, uniform, aqueous, dye pastes of said dyes.

CROSS-REFERENCE TO RELATED APPLICATIONS

This is a division of application Ser. No. 764,966, filed Oct. 3, 1968, now U.S. Pat. No. 3,600,376.

BACKGROUND OF THE INVENTION (1) Field of the invention

This invention relates to direct J-acid urea disazo dyestuffs for cellulosic materials, and more particularly, to bis(arylazo- and sulfoarylazo)-J-acid urea dyestuffs.

(2) Description of the prior art

Disazo dyes obtained by coupling aryl amines and derivatives thereof to J-acid urea (6,6'-ureylenebis-1-naphthol-3-sulfonic acid) are well known, as evidenced by German Pat. 122,904 granted Nov. 16, 1899. A more recent example of the prior art relative to such dyes is U.S. Pat. 2,746,955 issued May 22, 1956 to Armento. Colour Index Direct Red C.I. 29,220 is derived from J-acid urea and 2-naphthylamine-5-sulfonic acid. Prior art preparations of the aforesaid type of dye usually involve isolation in the form of their sodium salts or as the free acid. The coupling reaction mixtures in which such dyes are prepared contain only about 3 to 7% of the dye. The dyes, after isolation as a dry powder, are widely used for dyeing cellulosics, including cotton and paper, but especially the latter. To be useful for dyeing paper, the dyes must be reasonably soluble in water, substantive to paper, and bleedproof when the dyed paper is wet. Prior art dyes of the above type usually are sold as dry powders having 20 to 80 weight percent active ingredient. Use of such powders in conventional dyeing processes often is objectionable because of dusting problems which make the dyes difficult to handle and weigh and which may result in undesirable staining because of drifting of the powder. Moreover, dissolution of such powders may be difficult, especially in cold beater applications during winter months when the temperature of the water approaches the freezing point. Low solubilities may cause pumping and metering problems, thus adversely influencing the controllability of the dyeing process, as well as specking problems.

OBJECTS AND SUMMARY OF THE INVENTION

It is an object of the present invention to provide stable, uniform, aqueous, dye pastes of J-acid urea disazo dyestuffs. It is a further object to provide such dye pastes of suitable dye concentration, 10–20 weight percent active ingredient, that they can be employed directly in conventional cellulosic dyeing processes, thus avoiding the problems of handling said dyes as dry powders. Another object is to provide such dye pastes which can be pumped and measured volumetrically during the dyeing process. Still another object is to provide a process of preparation of such dye pastes. A further object is to provide such a process of preparation that permits the reaction mixture to be standardized in the reaction vessel, and thereafter directly packaged for sale and use, thus eliminating isolation, purification and treatment of the dye product.

The objects of the invention are achieved by means of a process for coupling aryl diazonium and sulfoaryl diazonium compounds to J-acid urea in an aqueous medium, the process comprising adding the diazonium to the J-acid urea in a neutral to alkaline aqueous medium to which is added a lithium base selected from the hydroxide, bicarbonate and carbonate.

DESCRIPTION OF THE INVENTION

The present invention resides in the discovery that when an aryl diazonium salt or a sulfoaryl diazonium salt is coupled to J-acid urea under neutral to alkaline conditions using a lithium base such as lithium hydroxide, bicarbonate or carbonate, the reaction can be carried out in such a manner that the reaction mixture is comprised of 10 to 20 weight percent of active ingredient, that is, the coupled dye product, thus permitting direct use of the reaction mixture in conventional cellulosic dyeing processes. More particularly, J-acid urea is slurried in a minimum amount of water with one of the aforesaid lithium bases to give a neutral to alkaline pH. To this slurry is added in a conventional manner a diazo slurry, at minimum dilution, prepared by diazotizing an aryl amine or an aryl amine sulfonic acid, the aryl amine being a phenyl amine or a naphthyl amine. The phenyl amine or naphthyl amine, as indicated above, may be sulfo-substituted. Other substituents, also, may be present on the aromatic moiety, for example, a methyl, methoxy or hydroxy group, especially when the aromatic moiety is a phenyl group as opposed to a naphthyl group. Throughout the coupling reaction the pH is maintained from neutral to alkaline with the aforesaid lithium base. Preferably, the pH is maintained at 7.0–9.5. The coupling usually is carried out at elevated temperatures. Below 30° C. coupling is usually to slow and the reaction mixture is too thick for efficient operation. Above 60° C. the decomposition of the diazonium compound usually is excessive and lower yields of desired product are obtained. The preferred coupling temperature is about 45° C. As indicated above, the volume of water employed in effecting the coupling should be at a minimum. More specifically, the volume preferably should be such that the active dye product will constitute 10 to 20 weight percent of the reaction mixture. If a symmetrical J-acid urea disazo dye is desired, the stoichiometry requires that at least two moles of diazonium compound be employed for each mole of J-acid urea. Unsymmetrical dyes can be produced by using at least two moles (total) of two or more different diazonium compounds. The different diazonium compounds can be used in any proportions to each other and they can be added as a mixture or in separate steps. Usually the diazonium is added below the surface of the J-acid urea slurry at the point of optimum dispersion into the reaction medium. Addition should be at a rate approximately equal to the reaction rate with the J-acid urea. Addition at faster rates will result in unnecessary loss of diazonium by decomposition. A sample of reaction mass should be removed periodically and analyzed for diazonium (to determine if the addition is too rapid), for example, by adding to acid and streaking on paper with alkaline H-acid (color indicates diazonium in sample). When coupling is complete (stirring of the reaction mixture usually is continued for some time after all the diazonium has been added), the reaction mixture is standardized and the concentration of dye is adjusted, if necessary, by addition or removal of water. A pH adjustment may be made, if desired, and additives, such as dispersants, may be introduced at this stage. The mixture then is ready for packaging and use, although it is usually filtered just prior to packaging, for example, through a 50–300 mesh screen (U.S. Bureau of Standards, Standard Screen Series, 1919).

A particularly useful dye product of this invention contains, on a weight basis, 10–20%, calculated as free acid, of dye produced by the process of this invention
0.10.4% Li+
0.5–2.5% Na+
1.7–4.3% anion selected from Cl−, HCO3− and CO3=
72.8–87.7% water.

The process of the present invention permits efficient production of pumpable dye slurries containing 10 to 20 weight percent active dye, as opposed to prior art coupling processes whose reaction mixtures contain only 3 to 7% dye. At least about fourfold increases in production capacity can be obtained using the process of this invention. Still further advantages are realized since the dye product does not have to be filtered, washed and dried as in prior art processes. The high active ingredient levels of the slurries of this invention enable dyers to use the reaction mixtures directly in place of the prior art, corresponding, dry powder, dyes which contain 20 to 80 weight percent active dye. Thus, the problems of handling the dry powders are overcome.

The fact that the maximum benefit from the process of this invention resides in a direct use of the liquid reaction mixture does not preclude isolation of dry dye powder. The higher production capacity achieved by the process of this invention represents a substantial advantage even if it is desirable to produce a dry powder product, for example, by spray drying or other prior art recovery means. It is believed that when isolated, the dyes of this invention are substantially in the form of lithium salts and, further, that the unexpectedly high solubilities of such salts are responsible, at least in part, for the high efficiency at which the instant process can be carried out.

The invention is illustrated by the following examples. All parts and percentages are by weight unless otherwise indicated. Lithium hydroxide was used as the monohydrate.

EXAMPLE 1

46.0 parts of Broenner's acid (2-naphthylamine-6-sulfonic acid) were stirred into 150 parts of water and 11.7 parts of hydrochloric acid (as 31% solution) were added; then 14.5 parts of sodium nitrite (as 31.5% solution) were added in 20 minutes at 20–22° C. The slurry was stirred for 3 hours, holding a slight excess of nitrite by addition of extra sodium nitrite if needed.

In another vessel 50.4 parts of J-acid urea were stirred into 150 parts of water, 20.5 parts of lithium carbonate were added and the resulting slurry was heated to 45° C. The above preparation of Broenner's acid diazo was gradually added to the J-acid urea in 30 minutes with good mixing, holding the temperature in the range of 43–47° C. and adding extra lithium carbonate as needed to keep the pH in the range of 7.5 to 8.5. No extra water was added to the reaction, to avoid dilution. About 695 parts of final coupling mixture were obtained as a fluid paste which remained fluid even after storage at room temperature for about 6 month. Strength of the fluid paste was adjusted as desired by adding or removing water. The dye paste was used in a conventional process to dye paper a bright scarlet shade.

EXAMPLE 2

35.5 parts of Broenner's acid were stirred into 150 parts of water and 8.4 parts of hydrochloric acid (as 31% solution) were added; then 10.5 parts of sodium nitrite (as 31.5% solution) were added in 20 minutes at 20–22° C. The slurry was stirred for 3 hours, holding a slight excess of nitrite.

In another vessel 11.2 parts of 2-aminotoluene-5-sulfonic acid were stirred into 50 parts of water and 2.8 parts of hydrochloric acid (as 31% solution) were added. Then 3.6 parts of sodium nitrite (as 31.5% solution) were gradually added at 18–21° C. and the mixture was stirred at this temperature for 2 hours, holding a slight excess of nitrite.

In another vessel 50.4 parts of J-acid urea and 20.5 parts of lithium carbonate were stirred into 230 parts of water and heated to 45° C. While maintaining good mixing, the above preparation of Broenner's acid diazo was gradually added to the J-acid urea in 30 minutes, followed by the diazo of 2-aminotoluene-5-sulfonic acid in 20 minutes. During both additions, temperatures were held at 45–48° C. and the pH was kept at 7.5 to 8.5. About 838 parts of final coupling mixture were obtained as a fluid paste which remained fluid even after storage at room temperature for about 3 months. The dye paste was used in a conventional process to dye paper a bright scarlet shade.

EXAMPLE 3

In a suitable vessel 41.9 parts of 4-methoxymetanilic acid were stirred into 150 parts of water and 11.7 parts of hydrochloric acid (as 31% solution) were added; then 14.5 parts of sodium nitrite (as 31.5% solution) were gradually added in 20 minutes at 18–20° C.; stirring was continued one hour to complete the diazotization.

In another vessel 50.4 parts of J-acid urea and 20.5 parts of lithium carbonate were stirred into 150 parts of water and heated to 45° C. The 4-methoxymetanilic acid diazo was then added to the J-acid urea slurry gradually in 30 minutes, holding the temperature at 45–48° C. and the pH in the range of 7.5–8.5. The coupling mixture was a thin liquid of 621 parts. It remained fluid even after storage at room temperature for about 6 months. The paste was used in a conventional process to dye paper a bright scarlet shade.

EXAMPLE 4

45.8 parts of Broenner's acid were stirred into 150 parts of water and 9.2 parts of hydrochloric acid (as 31% solution) were added; then 14.5 parts of sodium nitrite (as 31.5% solution) were added in 20 minutes at 20–22° C. Small quantities of extra hydrochloric acid and sodium nitrite were added to maintain tests for strong mineral acidity and excess nitrite and the mixture was stirred for 3 hours.

In another vessel 50.4 parts of J-acid urea were stirred into 120 parts of water; 14.6 parts of borax

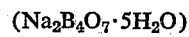
(Na2B4O7·5H2O)

were added and the slurry was heated to 45° C. The above preparation of Broenner's acid diazo was gradually added to the J-acid urea in 20 minutes with good mixing, maintaining a temperature of 45° C. During the diazo addition the pH of the coupling mixture was kept in the range of 7.9 to 8.1 by the gradual addition of a 20% solution of lithium hydroxide monohydrate in water (10.8 parts LiOH·H2O required). 627 parts of final coupling mixture was obtained as a thin liquid. It was used in a conventional process to dye paper a bright scarlet shade. An equally attractive shade was obtained when the paste was used in a conventional process to dye cotton.

EXAMPLE 5

26.2 grams of aniline were added to 55.5 cc. of concentrated hydrochloric acid and ice; 20 grams of solid sodium nitrite were added, keeping the temperature at 0° C. with external cooling; volume was 192 cc.

In another flask 63.2 grams of J-acid urea were mixed with 150 cc. of water and 20 grams of borax (volume now 275 cc.) and heated to 45° C. The above aniline diazo solution and 10% aqueous lithium hydroxide solution were added simultaneously in 1 hour to the J-acid urea, maintaining the temperature at 45° C. The pH was controlled at 9.0±0.2 by regulation of the lithium hydroxide feed from a buret. The resulting product (volume 575 cc., sp. gr. 1.126) was a dye paste that remained fluid at room temperature for extended periods. It was used in a conventional process to dye paper a bright orange.

The embodiments of the invention in which an exclusive property or privilege is claimed are defined as follows:

1. The reaction mixture resulting from the improved process of forming a stable, uniform, pumpable, concentrated, aqueous dye paste of a J-acid urea disazo dye which has been prepared by coupling, in a neutral to alkaline aqueous medium employing prior art temperatures and reactant proportions, a phenyl, naphthyl, sulfophenyl or sulfonaphthyl diazonium compound to J-acid urea, the improvement which consists of forming the dye paste while simultaneously carrying out the coupling reaction by controlling the pH of the reaction medium with lithium hydroxide, lithium bicarbonate or lithium carbonate, the reaction mixture containing, on a weight basis, 10–20%, as free acid, of the dye produced by the aforesaid improved process
0.1–0.4% $Li^+$
0.5–2.5% $Na^+$
1.7–4.3% anion selected from $Cl^-$, $HCO_3^-$ and $CO_3^=$
72.8–87.7% water.

2. In an improved process for dyeing a cellulosic material selected from cotton and paper with a direct bis (arylazo or sulfoarylazo)-J-acid urea, the improvement which comprises using the reaction mixture resulting from the process of claim 1.

References Cited
UNITED STATES PATENTS

| | | | |
|---|---|---|---|
| 2,746,955 | 5/1956 | Armento | 260—175 |
| 3,621,008 | 11/1971 | Ross | 210—175 |
| 3,643,269 | 2/1972 | Schweizer | 8—41 |

GEORGE F. LESMES, Primary Examiner

P. C. IVES, Assistant Examiner

U.S. Cl. X.R.

8—41 R, 79, 82

Disclaimer

3,701,624.—*Richard C. Franklin*, Wilmington, Del. DYEING COTTON AND PAPER WITH BIS(ARYLAZO OR SULFOARYLAZO)-J-ACID UREA REACTION MIXTURE AND COMPOSITION THEREFOR. Patent dated Oct. 31, 1972. Disclaimer filed Feb. 26, 1975, by the assignee, *E. I. du Pont de Nemours and Company*.

Hereby enters this disclaimer to claim 2 of said patent.

[*Official Gazette July 15, 1975.*]